United States Patent
James

(10) Patent No.: US 6,584,550 B1
(45) Date of Patent: Jun. 24, 2003

(54) SYSTEM AND METHOD FOR UPDATING A HEAD ENTRY FROM READ-ONLY TO READ-WRITE AND ALLOWING A LIST TO EXPAND IN A CACHE-COHERENCE SHARING LIST

(75) Inventor: David V. James, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/450,844

(22) Filed: Nov. 29, 1999

(51) Int. Cl.[7] .............................................. G06F 12/00
(52) U.S. Cl. ...................................... 711/145; 711/156
(58) Field of Search ................................. 711/141, 144, 711/145, 142, 143, 146, 154, 155, 156, 129, 173, 153

(56) References Cited

PUBLICATIONS

Draft 0.36 IEEE P1596.2–1996, "IEEE Standard for Cache Optimization for Large Numbers of Processors using the Scalable Coherent Interface (SCI)," Draft 0.36, Nov. 18, 1996.

*Primary Examiner*—Matthew Kim
*Assistant Examiner*—Matthew D. Anderson
(74) *Attorney, Agent, or Firm*—Nancy R. Simon; Simon & Koerner LLP

(57) ABSTRACT

In a multi-processor system having cache-coherent sharing list, initiating a request to obtain a read-write copy updates a head of a cache sharing list from read-only status to read-write status. If another cache joins the list before the updating transaction has been completed, the present invention allows a read-only copy and a read-write copy of the head to exist concurrently in two list locations. When prepending to each of the copies coded command sets are applied based on the different states of the copies, resulting in two prepending groups, a first group associated with the read-only copy and a second group associated with the read-write copy. The method then allows servicing the read-only group while the read-write group waits. After all services to the read-only group have been performed, the head is modified and stale cache copies are invalidated. The read-write group is then serviced.

13 Claims, 19 Drawing Sheets

| | OLD STATE | GENERATED REQUEST | RETURNED RESPONSE | NEW STATE |
|---|---|---|---|---|
| (1a) | HEADf | mReadOwned | DONE_H | HEADd_INVAL |
| (1b) | HEADf | mReadOwned | DONE_F | PAIRfd_INVAL |
| (1c) | HEADf | mReadOwned | DONE_S | PAIRsd_INVAL |
| (2a) | HEADd_INVAL | cMarkInval_F | MORE, IDnext | HEADd_INVAL |
| (2b) | HEADd_INVAL | cMarkInval_F | LAST | ONLYd |
| (2c) | HEADd_INVAL | cMarkInval_F | BUSY | HEADd_INVAL |
| (3a) | PAIRfd_INVAL | cMarkInval_F | MORE, IDnext | PAIRfd_INVAL |
| (3b) | PAIRfd_INVAL | cMarkInval_F | LAST | LEADf_INVAL |
| (3c) | PAIRfd_INVAL | cMarkInval_F | BUSY | PAIRfd_INVAL |
| (4a) | PAIRsd_INVAL | cMarkInval_S | MORE, IDnext | PAIRsd_INVAL |
| (4b) | PAIRsd_INVAL | cMarkInval_S | LAST | LEADs_INVAL |
| (4c) | PAIRsd_INVAL | cMarkInval_S | BUSY | PAIRsd_INVAL |
| (5a) | LEADf_INVAL | cMarkInval_F | MORE, IDnext | LEADf_INVAL |
| (5b) | LEADf_INVAL | cMarkInval_F | LAST | ONLYd |
| (5c) | LEADf_INVAL | cMarkInval_F | BUSY | LEADf_INVAL |
| (6a) | LEADs_INVAL | cMarkInval_S | MORE, IDnext | LEADs_INVAL |
| (6b) | LEADs_INVAL | cMarkInval_S | LAST | ONLYd |
| (6c) | LEADs_INVAL | cMarkInval_S | BUSY | LEADs_INVAL |

FIG. 8

|  | OLD STATE | OLD ID | RECEIVED REQUESTED | NEW STATE | NEW ID | RETURNED RESPONSE |
|---|---|---|---|---|---|---|
| (1a) | HOME | | mReadFresh | FRESH | IDreq | DONE_H |
| (1b) | HOME | | mReadOwned | STALE | IDreq | DONE_H |
| (2a) | FRESH | IDold | mReadFresh | FRESH | IDreq | DONE_F |
| (2b) | FRESH | IDold | mReadOwned | STALE | IDreq | DONE_F |
| (3a) | STALE | IDold | mReadFresh | STALE | IDreq | DONE_S |
| (3b) | STALE | IDold | mReadOwned | STALE | IDreq | DONE_S |

FIG. 9

|  | OLD STATE | REQUEST | RESPONSE | NEW STATE |
|---|---|---|---|---|
| (1a) | CORE | cMarkInval_F | MORE, IDnext | INVAL |
| (1b) | CORE | cMarkInval_S | MORE, IDnext | INVAL |
| (2a) | TAIL | cMarkInval_F | LAST | INVAL |
| (2b) | TAIL | cMarkInval_S | LAST | INVAL |
| (3a) | HEADd_INVAL | cMarkInval_F | BUSY | HEADd_INVAL |
| (3b) | HEADd_INVAL | cMarkInval_S | BUSY | HEADd_INVAL |
| (4a) | PAIRfd_INVAL | cMarkInval_F | MORE, IDnext | HEADd_INVAL |
| (4b) | PAIRfd_INVAL | cMarkInval_S | BUSY | PAIRfd_INVAL |
| (5a) | PAIRsd_INVAL | cMarkInval_F | MORE, IDnext | HEADd_INVAL |
| (5b) | PAIRsd_INVAL | cMarkInval_S | BUSY | PAIRsd_INVAL |
| (6a) | LEADf_INVAL | cMarkInval_F | LAST | HEADd_INVAL |
| (6b) | LEADf_INVAL | cMarkInval_S | BUSY | LEADf_INVAL |
| (7a) | LEADs_INVAL | cMarkInval_F | LAST | LEADs_INVAL |
| (7b) | LEADs_INVAL | cMarkInval_S | BUSY | LEADs_INVAL |

FIG. 10

SYSTEM AND METHOD FOR UPDATING A HEAD ENTRY FROM READ-ONLY TO READ-WRITE AND ALLOWING A LIST TO EXPAND IN A CACHE-COHERENCE SHARING LIST

This Application is related to U.S. Pat. No. 6,321,304, entitled "System and Method for Deleting Read-Only Head Entries in Multi-Processor Computer Systems Supporting Cache Coherence with Mixed Protocols," filed on Jan. 22, 1999, and U.S. patent application Ser. No. 09/426,058, entitled "System and Method for Updating from a Read-Only to a Read-Write Entry and Concurrently Invalidating Stale Cache Copies from Head-to-Tail and Tail-to-Head Directions," filed on Oct. 22, 1999, which are hereby incorporated by reference.

BACKGROUND OF THE INVENTION

1. Field of the Invention

This invention relates generally to multiple processor computer systems and more particularly to cache coherence in such systems.

2. Description of the Background Art

Multiple-processor computer systems involve various processors which at the same time may each work on a separate portion of a problem or work on a different problem. FIG. 1 shows a multi-processor system, including a plurality of Central Processing Units (CPUs) or processors 102A, 102B ... 102N, communicating with memory 104 via interconnect 106, which could be, for example, a bus or a collection of point-to-point links. Processors 102 access data from memory 104 for a read or a write. In a read operation, processor 102 receives data from memory 104 without modifying the data, while in a write operation processor 102 modifies the data transmitted to memory 104.

Each processor 102 generally has a respective cache unit 108A, 108B, ... 108N, which is a relatively small group of high speed memory cells dedicated to that processor. A processor 102's cache 108 is usually on the processor chip itself or may be on separate chips, but is local to processor 102. Cache 108 for each processor 102 is used to hold data that was accessed recently by that processor. Since a processor 102 does not have to go through the interconnecting bus 106 and wait for the bus 106 traffic, the processor 102 can generally access data in its cache 108 faster than it can access data in the main memory 104. In a normal operation, a processor 102N first reads data from memory 104 and copies that data to the processor's own cache 108N. During subsequent accesses for the same data the processor 102N fetches the data from its own cache 108N. In effect, after the first read, data in cache 108N is the same copy of data in memory 104 except that the data is now in a high-speed local storage. Typically, cache 108N can be accessed in one or two cycles of CPU time while it takes a processor 102 15 to 50 cycles to access memory 104. A typical processor 102 runs at about 333 Mhz or 3 ns (nanoseconds) per cycle, but it takes at least 60 ns or 20 cycles to access memory 104.

A measure of data, typically 32, 64, 128, or $2^n$ bytes, brought from memory 104 to cache 108 is usually called a "cache line." The data of which a copy was brought to cache 108 and which remains in memory 104 is called a "memory line." The size of a cache line or a memory line is determined by a balance of the overhead per read/write operation versus the usual amount of data transferred from memory and cache. An efficient size for a cache line results in transfers spending about 25% of their time on overhead and 75% of their time on actual data transfer.

A particular problem with using caches is that data becomes "stale." A first processor 102A may access data in the main memory 104 and copy the data into its cache 108A. If the first processor 102A then modifies the cache line of data in its cache 108A, then at that instant the corresponding memory line becomes stale. If a second processor, 102B for example, subsequently accesses the original data in the main memory 104, the second processor 102B will not find the most current version of the data because the most current version is in the cache 108A. For each cache-line address, cache coherence guarantees that only one copy of data in cache 108 can be modified. Identical copies of a cache line may be present in multiple caches 108, and thus be read by multiple processors 102 at the same time, but only one processor 102 is allowed to write, i.e., modify, the data. After a processor 102 writes to its cache 108 that processor 102 must "invalidate" any copies of that data in other caches to notify other processors 102 that their cache lines are no longer current.

FIG. 2A shows valid cache lines D0 for caches 108A to 108N whereas FIG. 2B shows cache 108B with an updated cache line D1 and other caches 108A, 108C, and 108N with invalidated cache lines D0. The processors 102A, 102C, and 102N with invalidated cache data D0 in their respective caches 108 must fetch the updated version of cache line D1 if they want to access that data line again.

Normally and for illustrative purposes in the following discussion, cache coherence protocols are executed by processors 102 associated with their related caches. However, in other embodiments these protocols may be executed by one or more specialized and dedicated cache controllers.

There are different cache coherence management methods for permitting a processor 102 to modify its cache line in cache 108 and invalidate other cache lines. One method (related to the present invention) utilizes, for each cache line, a respective "shared list" representing cache-line correspondences by "double-links" where each cache has a forward pointer pointing to the next cache entry in the list and a backward pointer pointing to the previous cache entry in the list. Memory 104 has a pointer which always points to the head of the list.

FIG. 3 shows a linked list 300 of caches 108A ... 108N with the associated memory 104. Memory 104 has a pointer which always points to the head (cache 108A) of the list while the forward pointers Af, Bf, and Cf of caches 108A, 108B, and 108C respectively point forward to the succeeding caches 108B, 108C, and 108D (not shown). Similarly, backward pointers Nb, Cb, and Bb of caches 108N, 108C, and 108B respectively point backward to the preceding caches. Because each cache unit 108 is associated with a respective processor 102, a linked list representation of cache 108 is also understood as a linked list representation of processors 102.

There are typically two types of cache sharing list. The first type list is the read-only (sometimes called "fresh") list of caches for-which none of the processors 102 has permission to modify the data. The second type list is a read-write (sometimes called "owned") list of caches for which the head-of-list processor 102 may have permission to write to its cache 108. A list is considered "stable" after an entry has been completely entered into or completely deleted from the list. Each of the stable list states is defined by the state of the memory and the states of the entries in the shared list. Relevant states of memory include HOME, FRESH, and STALE. HOME indicates no shared list exists, FRESH indicates a read-only shared list, and STALE indicates the shared list is a read-write list and data in the list can be modified. A processor 102 must get authorization to write to or read from memory 104. A list entry always enters the list as the list head, and the action of entering is referred to as "prepending" to the list. If a list is FRESH (the data is the same as in memory), the entry that becomes the newly created head receives data from memory; otherwise it receives data from the previous list head. In a read-write list, only the head is allowed to modify (or write to) its own cache line and, after the head has written the data, the head must invalidate the other stale copies of the shared list. In one embodiment, invalidation is done by purging the pending invalidated entries of the shared list.

FIGS. 4A–4F illustrate how the two types of list are created and grown. Each of the FIGS. 4 includes a before and an after list with states of the list and memory 104. In FIG. 4A, initially memory 104 is in the HOME state, indicating there is no cache shared list. Processor 102A requests permission to read a cache line. Since this is a read request, memory 104 changes from the HOME state to the FRESH state, and the resulting after list 402AR is a read-only list with one entry 108A. Cache 108A receives data from memory 104 because cache 108A accesses data that was previously uncached. This starts the read-only list 402AR.

In FIG. 4B processor 102B requests a read permission to enter the read-only list 402B, which is the same list as 402AR of FIG. 4A. Cache 108B then becomes the head of the list 402BR receiving data line from head 108A. The list 402BR is still a read-only list since both entries of the list have asked for read-only permission, and therefore the memory state remains FRESH.

In FIG. 4C, memory 104 is initially in the HOME state and processor 102A requests a read-write permission. Cache 108A then becomes the head of the list 402CR. Because a read-write permission was requested, list 402CR is a read-write list. As soon as memory 104 grants a read-write permission, memory 104 changes from the HOME state to the STALE state.

In FIG. 4D processor 102B requests a read permission to enter a read-write list 402D. Cache 108B becomes the head of the list 402DR. Since memory 104 is initially in the STALE state, the resulting list 402DR is a read-write list and memory 104 remains in the STALE state.

In FIG. 4E, the initial list 402E is read-only with memory 104 in the FRESH state, and processor 102B requests a write permission. Cache 108B then becomes the head of the list 402ER. Since processor 102B asked for a write permission, memory 104 changes state from FRESH to STALE, and list 402ER is a read-write list.

In FIG. 4F the list 402F is a read-write list and processor 102B requests a write permission. Since list 402F is read-write, list 402FR is also read-write, and memory 104 remains in the STALE state.

Cache list entries may be deleted. However, deleting a head-of-list presents a problem in mixed-coherence protocols, which exist where processor 102 associated with the head of the list supports a read-only option while processor 102 associated with the next-list entry supports only a read-write option. Currently most multi-processor systems support read-write lists and read-only lists are optional.

To update from a read-only list to a read-write list, the head of the list requests a read-write permission from memory 104 in the same way as any other cache entry would do. During the updating transaction if another cache has joined the list the head may end up in two places in the list. However, prior art solutions would not allow such a condition to exist. A transaction attempting to change a head from read-only to read-write would be aborted if a new entry had joined the list. A distinct abort scheme is therefore needed, requiring waiting for the expected prepend and then converting from a non-head to a read-write head.

SUMMARY OF THE INVENTION

In light of the deficiencies of prior art solutions, the present invention provides a system and method for updating a head of a cache coherence list from read-only to read-write. The invention allows two copies of one cache entry to exist in a list, and permits the list to expand. To update a head, a request is initiated. If a cache entry enters the list while an updating transaction is in progress, the invention allows there to be two cache copies having two distinct states, one read-only and one read-write, at different places in the list. One group of cache entries (the read-only group) enters the list by prepending to the read-only copy while another group of cache entries (the read-write group) enters the list by prepending to the read-write copy. During prepending, coded cache-to-cache command sets are implemented for the two read-only and read-write groups to distinctly communicate with the preperded cache entry. The read-only group possesses a command_F set ("F" for fresh or read-only) and the read-write group acquires a command_S set ("S" for state or read-write). The read-only group is then prepended to enter the list while the read-write group waits. The cache head is modified and invalidation follows. Finally the read-write group is prepended.

BRIEF DESCRIPTION OF THE DRAWINGS

FIG. 8 shows a state-transition table of a cache requester;

FIG. 9 shows a state-transition table of a memory responder; and

FIG. 10 shows a state-transition table of a cache responder.

DETAIL DESCRIPTION OF THE PREFERRED EMBODIMENT

A multi-processor system using cache-coherent sharing lists which initiates a request for an owned copy needs to update a head of a cache sharing list from the read-only state to the read-write state. If another cache entry joins the list while the updating transaction is in progress, the present invention allows a read-only copy and a read-write copy of the head to exist concurrently in respective locations in the list.

Figure 5A:
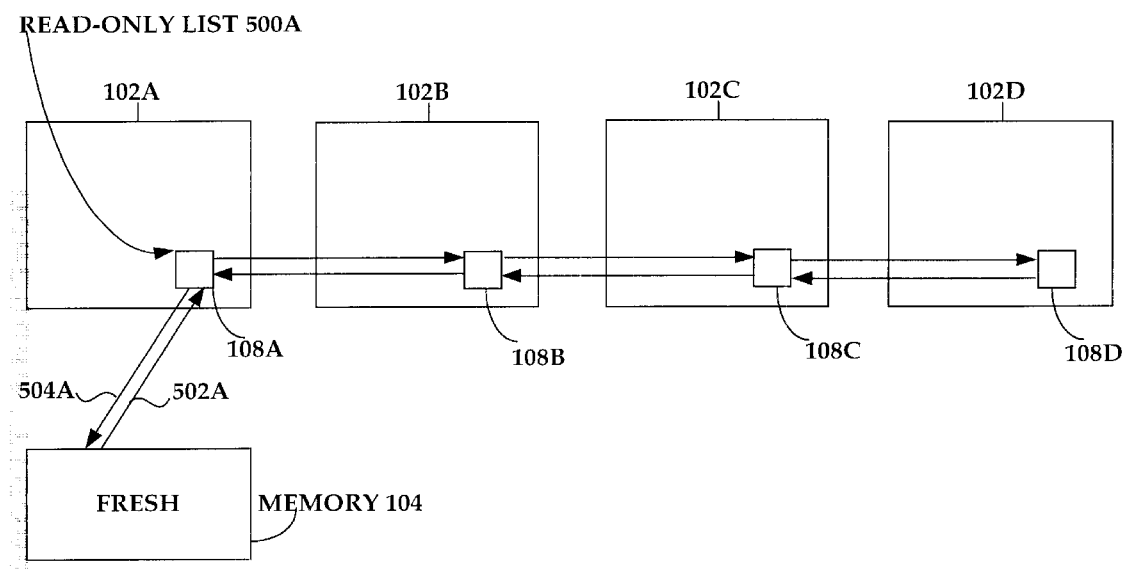
FIG. 5A shows a read-only list.

FIG. 5A shows a read-only list 500A having a cache 108A as the head and caches 108B, 108C, and 108D as members. Because cache 108A is the head of the list, memory 104 has pointer 502A pointing to cache 108A, and receives a pointer 504A from cache 108A pointing to memory 104. Further, because list 500A is read-only, memory 104 has a "Fresh" state.

Figure 5B:
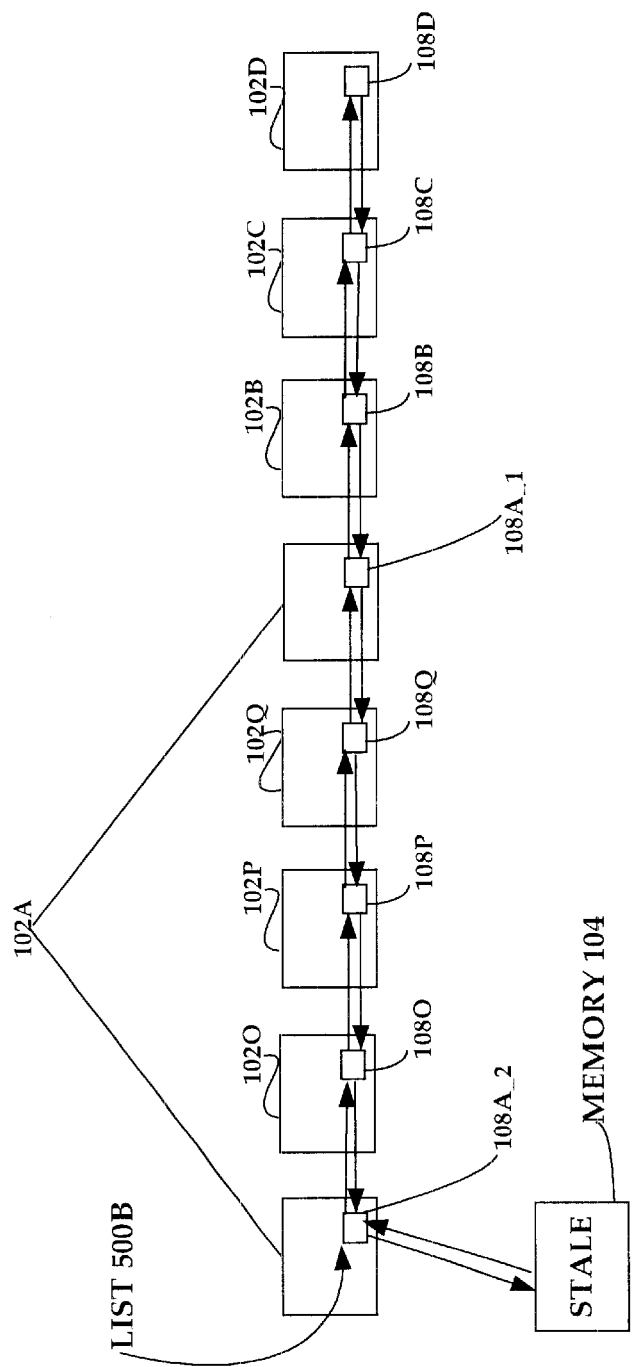
FIG. 5B shows two copies 108A_1 and 108A_2 of cache entry 108A in two places in a list.

FIG. 5B shows a read-write list 500B that is in transition from list 500A after processor 102A requests memory 104 to update list 500A from read-only to read-write. List 500B results when during the update transition from a read-only to a read-write list caches entries 108Q, 108P, and 108O have entered list 500A. The invention creates a copy of cache 108A, thus results in two cache copies 108A_1 and 108A_2, enables cache 108A_2 to become the head of list 500B, and permits the two copies 108A_1 and 108A_2 to exist in list 500B. The first copy 108A_1 has a read-only state while the second copy 108A_2 has a read-write state. In this FIG. 5B (and FIG. 5C below) even though only one processor 102A is associated with two cache copies 108A_1 and 108A_2 of cache 108A, the processor 102A, for illustration purposes, is shown twice. The invention, allowing list 500B to have two copies 108A_1 and 108A_2, is advantageous over prior art solutions in which two copies of a cache entry are prohibited. Caches 108O, 108P, and 108Q are members of a read-only list to prepend to cache 108A_1. Because list 500B is read-write, memory 104 has a "STALE" state.

Figure 5C:
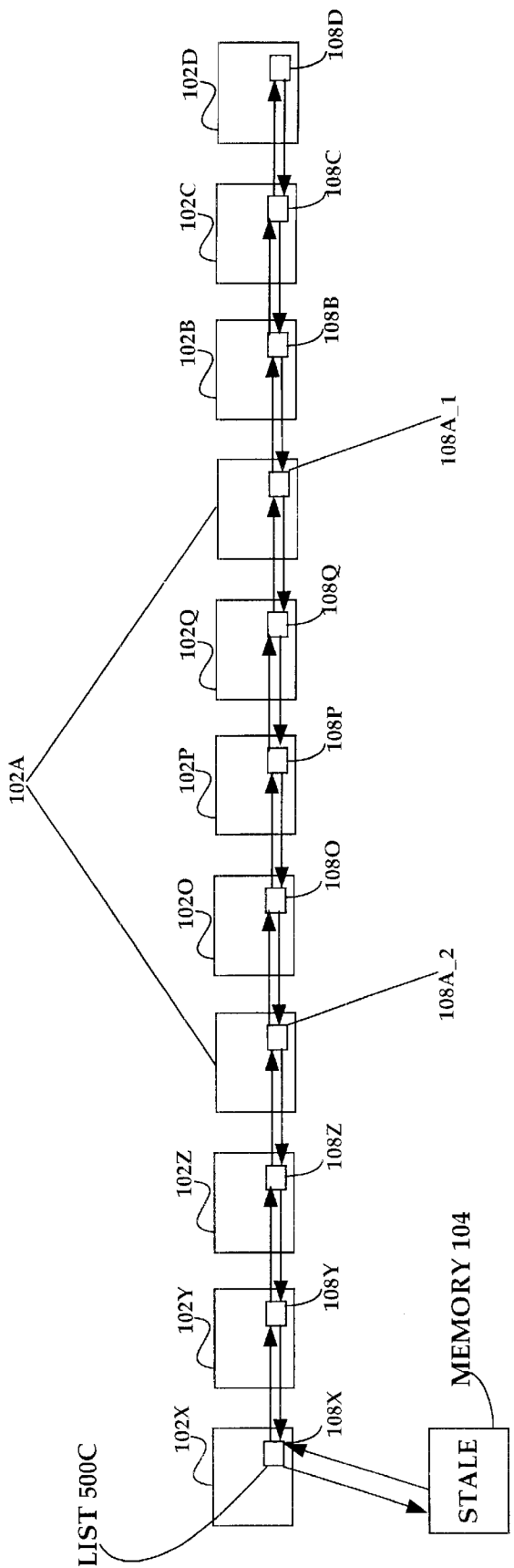
FIG. 5C shows a list being transformed from the list of FIG. 5A and the list of FIG. 5B.

FIG. 5C shows a read-write list 500C in which, subsequent to the formation of list 500B, caches entries 108Z, 108Y, and 108X desire to enter list 500B. Caches 108X, 108Y, and 108Z are entries of a read-write group to prepend to cache 108A_2 because cache 108A_2 has a read-write state.

Figure 5D:
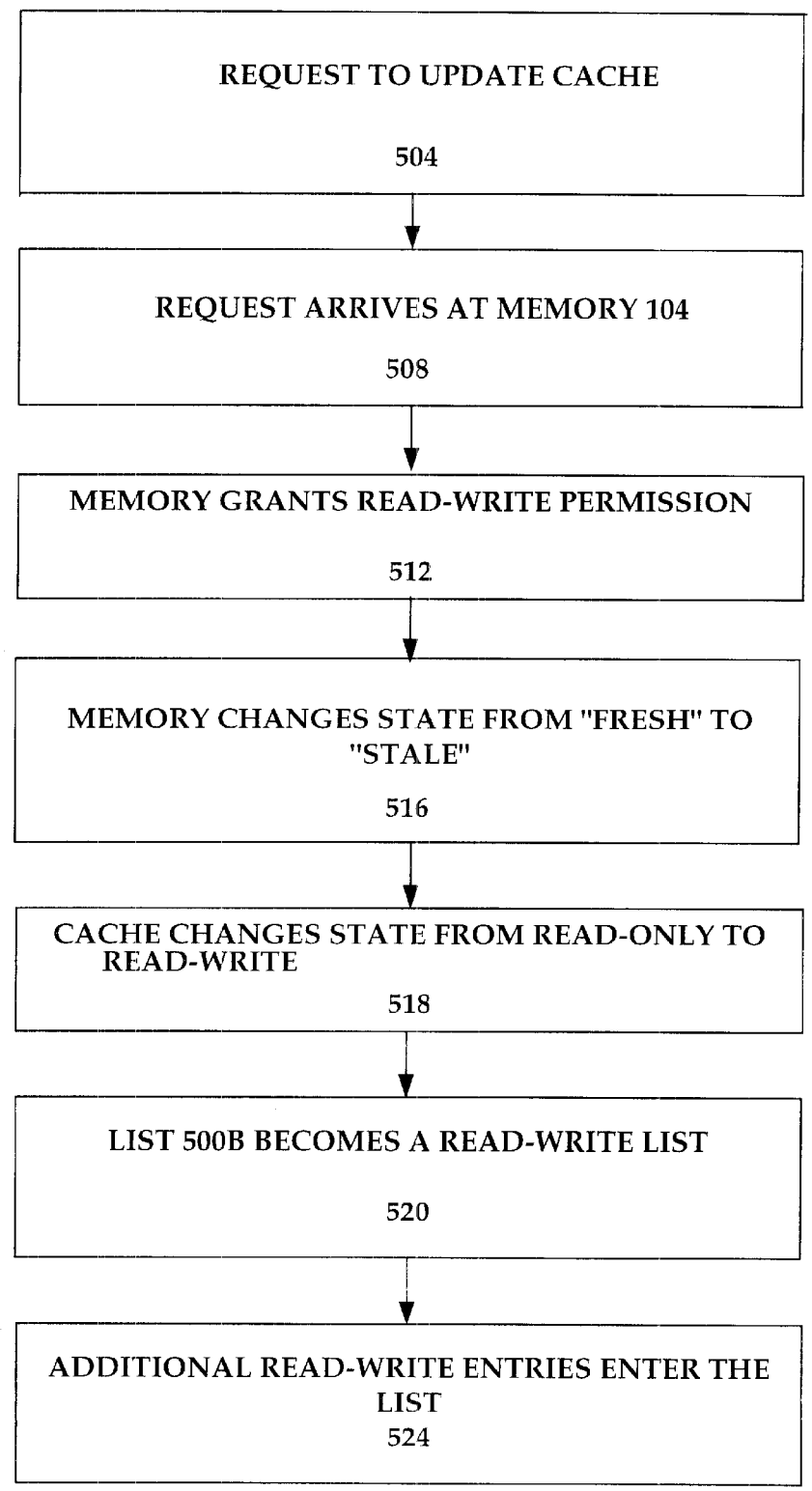
FIG. 5D is a flowchart illustrating how the list of FIG. 5A transforms into the list of FIG. 5C.

FIG. 5D shows steps by which list 500A is transformed into list 500B, then list 500C. At step 504, processor 102A initiates a request to memory 104 that processor 102A seeks to update its cache 108A. At step 508, the request arrives at memory 104. At step 512, memory 104 responds to the request by granting read-write permission. At step 516 memory 104 changes state from "FRESH" to "STALE," and at step 518 cache 108A changes state from read-only to read-write. However, because of the delay between step 504 and 508, other entries 108O, 108P and 108Q, for example, have desired to enter the list. These entries 108O, 108P and 108Q are referred to as members of a "read-only" group because they are entering the list by prepending to copy 108A_1, which has a read-only state. By the time at step 508 when the processor 102A's request reaches memory 104 cache 108A_1 may no longer be the head of the list, and because not all of the steps 504 to 518 have been completed, cache copy 108A_1 remains in the read-only state. At step 520 after memory 104 receives the request and grants a read-write permission to cache 108A, a second copy 108A_2 is created having a read-write state, and made the head of the list, resulting in list 500B in FIG. 5B. After copy 108A_2 has been made the head of the list, additional entries 108X, 108Y and 108Z, for examples, might have requested permission from memory 104 to enter the list in step 524, and thus forming list 500C of FIG. 5C. Cache entries 108X, 108Y and 108Z are referred to as member of a "read-write" group because they are entering the list by prepending to cache copy 108A_2, which has a read-write state.

The processor 102A in FIG. 5C, having two cache copies 108A_1 and 108A_2 in the list, in accordance with the invention, receives two different command sets from the two different read-only and read-write groups entering the list. Coded command sets are implemented so that processor 102A can distinguish which commands are sent to cache 108A_1 and which to cache 108A_2. Because copy 108A_1 has a read-only state, commands from the read-only group are preferably coded as command_F ("F" stands for fresh or read-only) while commands from the read-write group are preferably coded command_S ("S" stands for stale or read-write). To conveniently implement the invention, command_Fs and command_Ss are also used to indicate that memory 104 was previously in the read-only and read-write state, respectively.

Figure 6:
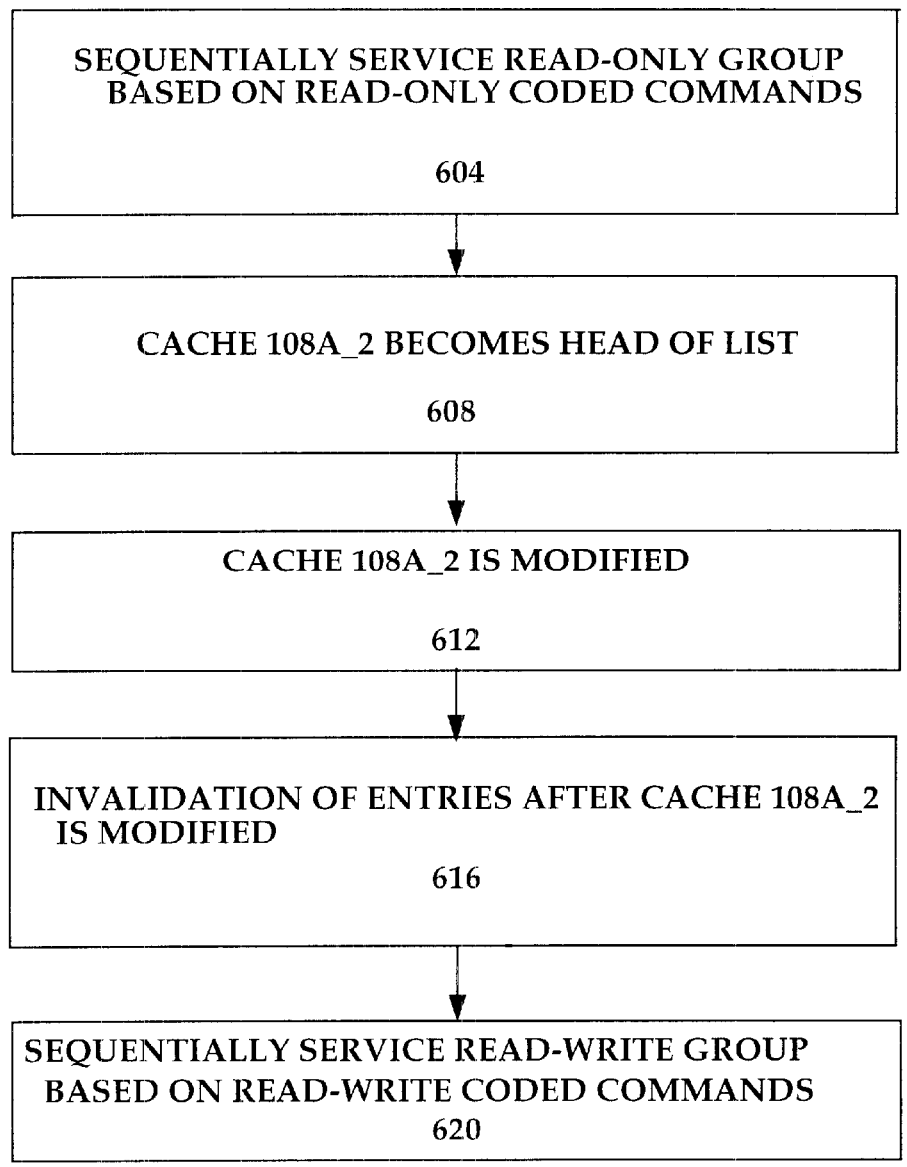
FIG. 6 is a flowchart illustrating a method in accordance with the present invention for servicing two groups having two coded command sets.

FIG. 6 illustrates steps in a method in accordance with the invention for servicing the two groups in list 500C of FIG. 5C. At step 604 the read-only group is serviced sequentially in the order 108Q, 108P and 108O. At step 608 cache 108A_2 becomes the head of the list and at step. 612 it is modified. At step 616 all stale cache copies (108O, 108P, 108Q, 108A_1, 108B, 108C, and 108D) are invalidated. At step 620 the read-write group is serviced sequentially in the order 108Z, 108Y and 108X, resulting in list 500C having cache 108X as the head of the list. Servicing of the two groups in steps 604 and 620 is done based on the distinguishable command_F and command_S.

Figure 7:
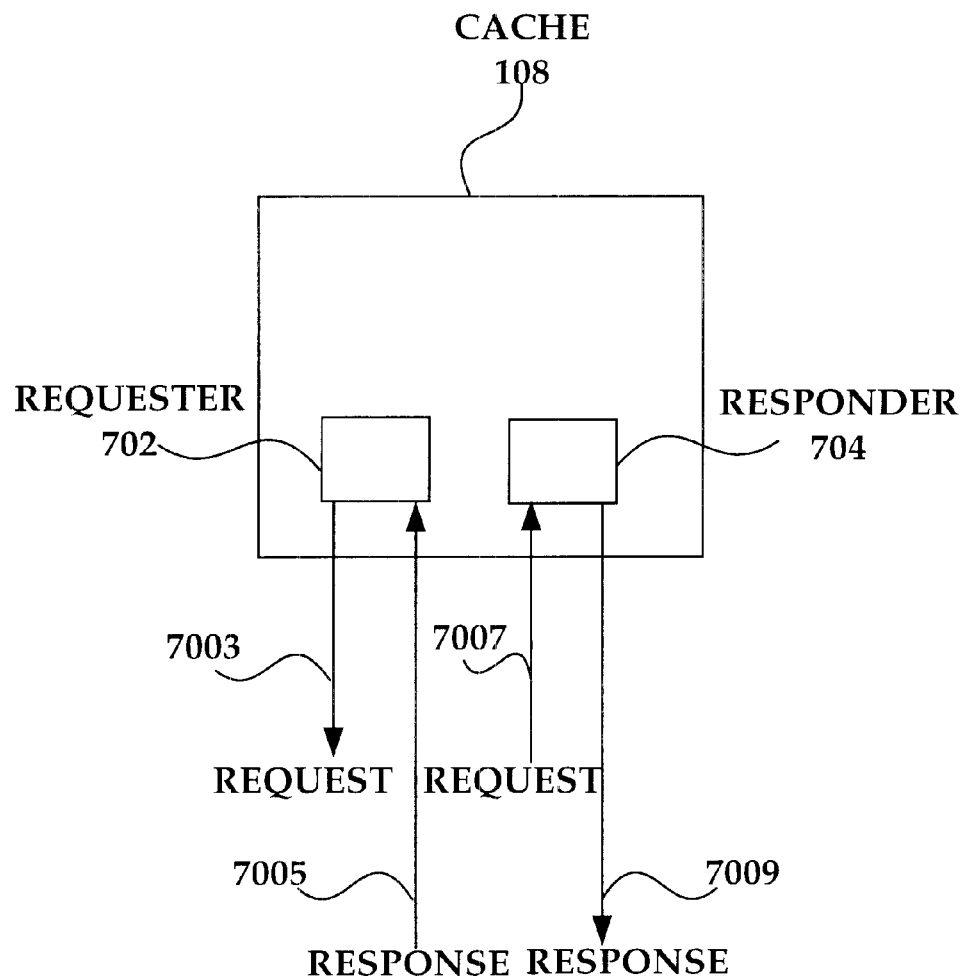
FIG. 7 shows a cache in accordance with the present invention.

FIG. 7 shows, in relevant parts, a cache 108 in accordance with the invention that includes a requester 702 and a responder 704. Requester 702, via a Request on line 7003, initiates an action desired by the processor 102 to another processor 102 or to memory 104, and receives a Response on line 7005. Responder 704 receives either from a processor 102 or memory 104 a Request on line 7007, and, via a Response on line 7009, responds to the action requested by a requester 702. In the preferred embodiment memory 104 includes a responder 704, but does not include a requester 702.

FIG. 8 shows a state-transition table of a cache requester 702 of cache 108A (or 108A_1 or 108A_2) in list 500A, list 500B, or list 500C. Rows 1a–1c show an action when cache 108A is the head ("HEAD") of a read-only ("f") list. Thus the old state of cache requester 702 is ("HEADf"). Cache 108A then issues a command mReadOwned to request memory ("m") 104 for a read-write ("Owned") permission.

In row 1a, cache 108A in FIG. 5 successfully becomes the head of a read-write list without other cache entries (e.g., 108O, 108P, 108Q, 108X, 108Y, 108Z) entering the list. Therefore, cache 108A receives a "DONE_H" response, which indicates that memory 104 previously pointed to the requester, i.e., cache 108A. Requester 702 then changes state to "HEADd_INVAL," that is cache 108A becomes the head ("HEAD") of a read-write ("d") list, and, when appropriate, will ask the next list entry to invalidate ("INVAL") itself.

In row 1b cache requester 702 receives a returned response "DONE F," that is memory 104 was previously in a read-only ("F") state, then cache requester 702 changes state to "PAIRfd_INVAL." "PAIR" indicates that the list will have two copies 108A_1 and 108A_2 of cache 108A. This is applicable when cache entries, e.g., 108O, 108P, and 108Q was trying to enter the list while cache 108A was transitioning from a read-only head to a read-write head. An "f" indicates that memory 104 was previously read-only. A "d" indicates that the list is a read-write list, and thus invalidation ("INVAL") of stale cache copies occurs when appropriate.

Row 1c is the same as row 1b except that in row 1c memory 104 was previously in a read-write state. Cache requester 702 thus receives a returned response "DONE S;" in which an "S" indicates a read-write state. Cache requester 702 then changes state to "PAIRsd_INVAL." "PAIR" indicates that two copies 108A_1 and 108A_2 of cache 108A are in the list. An "s" indicates that memory 104 previously had a read-write state, a "d" indicates that the list is a read-write list, and "INVAL" indicates that invalidation of stale cache entries occurs when appropriate.

In rows 2a, 2b, and 2c cache requester 702, in response to an action in rows 1a, 2a, or 2c, has a "HEADd_INVAL" state. Cache requester 702 then issues a "cMarkInval_F" request to ask a next cache ("c") entry in the list to invalidate ("MarkInval") itself. An "F" indicates that memory 104 was previously read-only.

In row 2a, cache requester 702 receives a "MORE" response which indicates that after the next list entry invalidates itself, there is an additional entry to be invalidated. This to-be-invalidated entry should be the next entry in the list. Cache requester 702 thus receives the identification ("IDnext") of the next entry, and remains the head ("HEAD") of the read-write ("d") list, and invalidation ("INVAL") occurs when appropriate.

In row 2b cache requester 702 receives a "LAST" response, then changes state to "ONLYd." "LAST" indicates that the next list entry (with respect to cache 108A) is the last entry in the list (cache 108D in FIG. 5A, for example). In this case, no cache entry (e.g. 108O, 108P, or 108Q) is entering the list during the update transition from a read-only to a read-write list, cache 108A has only 1 copy in the list and thus is the only ("ONLY") head in the read-write ("d") list.

In row 2c cache requester 702 receives a "BUSY" response, thus the cache requester's state is unchanged, or the new state is marked "HEADd_INVAL." "BUSY" indicates that the next list entry, for various reasons, cannot invalidate itself, and the request "cMarkInval_F" should be retried later.

In rows 3a, 3b, and 3c, cache requester 702, in response to an action in rows 1b, 3a, and 3c, has a "PAIRfd_INVAL" old state. A "PAIR" indicates that two copies 108A_1 and 108A_2 of cache 108A are in the list (FIG. 5B or 5C). An "f" indicates that memory 104 was previously in the read-only state. A "d" indicates that the list is read-write, and "INVAL" indicates that invalidation of stale caches occurs as appropriate. Cache requester 702 then issues a "cMarkInval_F" command to request the next cache entry to invalidate itself.

Row 3a is applicable when cache entry 108A_1 is invalidating other cache entries (e.g., 108B, 108C, and 108D). In this row 3a, cache requester 702 receives a "MORE" response indicating that additional cache entries are to be invalidated. Cache requester 702, receiving the identity of the next list entry ("IDnext") to continue invalidating, remains the same state, or its new state indicates "PAIRfd_INVAL."

Row 3b is applicable when cache entry 108A_1 is at the end of the list, i.e., cache entries 108B, 108C, and 108D have been invalidated. In this row 3b, cache requester 702 receives a "LAST" response, indicating that the next entry to be invalidated is cache 108A_1, which is the last of the list. Cache requester 702 then changes state to "LEADf_INVAL," indicating that cache 108A has had two copies 108A_1 and 108A_2 in the list but copy 108A_1 has been invalidated (or deleted from the list).

In row 3c cache requester 702, receiving a "BUSY" returned response, remains the same state, i.e., the new state is "PAIRfd_INVAL" as the old state. The "cMarkInval_F" should be retried later.

Rows 4a, 4b, and 4c are the same as rows 3a, 3b, and 3c, respectively, except that rows 4a, 4b, and 4c deal with the situations where memory 104 previously had a read-write state (indicated by an "s" in "PAIRsd_INVAL") instead of a read-only state (indicated by an "f" in "PAIRsd_INVAL") as in rows 3a, 3b, and 3c.

In rows 5a, 5b, and 5c, cache requester 702, in response to an action from rows 3b, 5a, and 5c, has a "LEADf_INVAL" old state, that is, cache 108A (or copy 108A_2) is the lead ("LEAD") of a read-write group, asking other caches (e.g. 108O, 108P, and 108Q) to orderly invalidate themselves. Cache requester 702 thus issues a command "cMarkInval_F."

In row 5a, when the next cache entry is not the other copy (cache entry 108A_1) of the "lead" (cache entry 108A_2), cache requester 702 receives a "MORE" response and the identity of the next cache entry ("IDnext"), and remains the "LEADf_INVAL" state.

In row 5b, when the next cache entry is the other copy of the lead and at the end of the list ("LAST), cache requester 702 changes state to "ONLYd," that is, after the next cache entry (cache 108A_1) is invalidated, cache 108A_2 is the only copy of cache 108A in the list.

In row 5c, cache requester 702 receives a "BUSY" response, and thus remains the "LEADf_INVAL" state.

Rows 6a, 6b, and 6c are the same as rows 5a, 5b, and 5c, respectively, except that rows 6a, 6b, and 6c deal with situations in which memory 104 previously had a read-write state (indicated by an "s" in "LEADs_INVAL") instead of a read-only state (indicated by an "f" in "LEADf_INVAL") as in rows 5a, 5b, and 5c.

FIG. 9 shows a state-transition table of a responder 704M of memory 104. In the preferred embodiment, responder 704M may receive from a cache 108 an "mReadFresh" request to obtain data for a read-only ("Fresh") list or an "mReadOwned" request for a read-write ("Owned") list. Rows 1a and 1b show action taken to create, for example, list 402AR of FIG. 4A and list 402CR of FIG. 4C, respectively. In row 1a memory 104 has a "HOME" old state, that is, no data was previously cached (before figures of FIGS. 4A and 4C). Because memory 104 does not point to any cache, the field "Old Id" shows blanks (or not marked).

Figure 1:
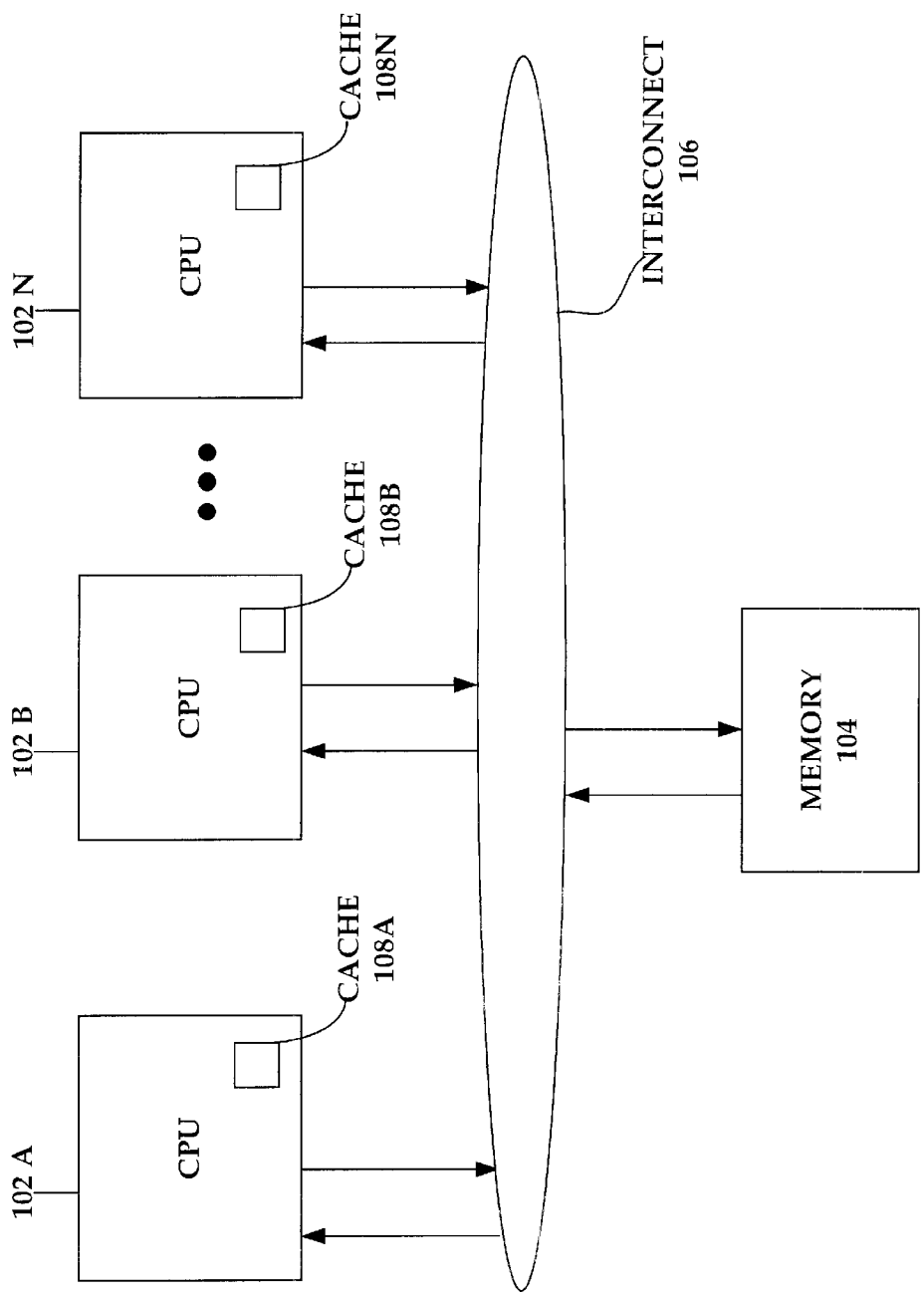
FIG. 1 shows a multi-processor system with a cache memory for each processor.
Figure 2A:
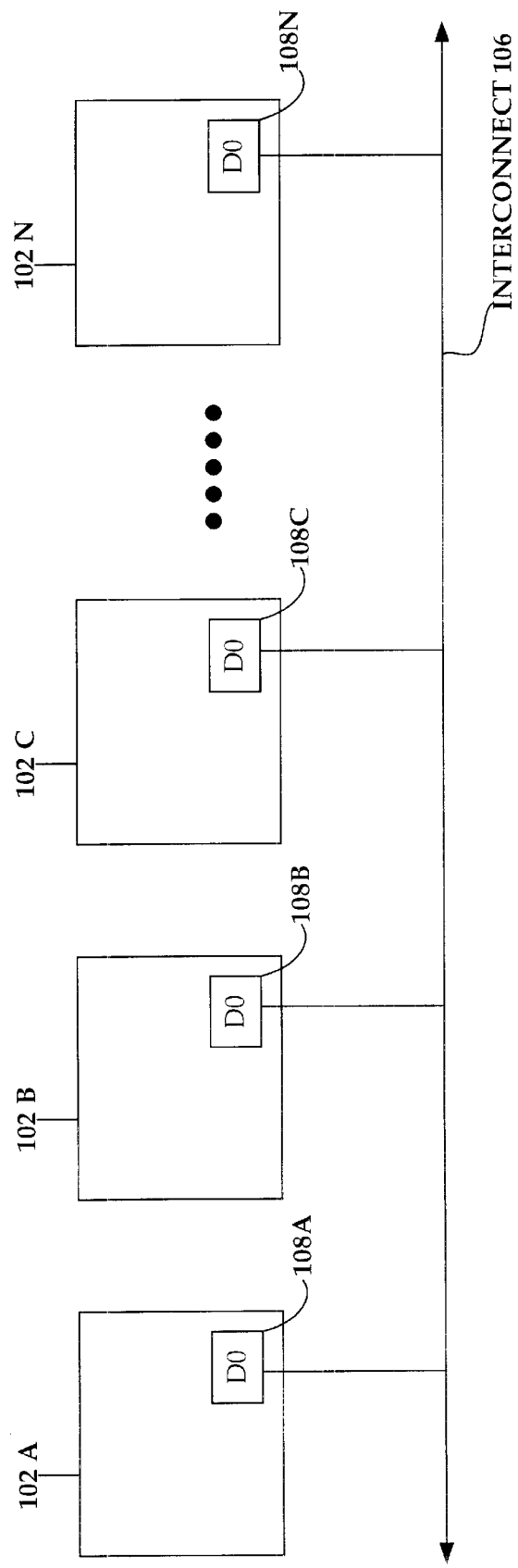
FIG. 2A illustrates all processors' cache lines being valid.
Figure 2B:
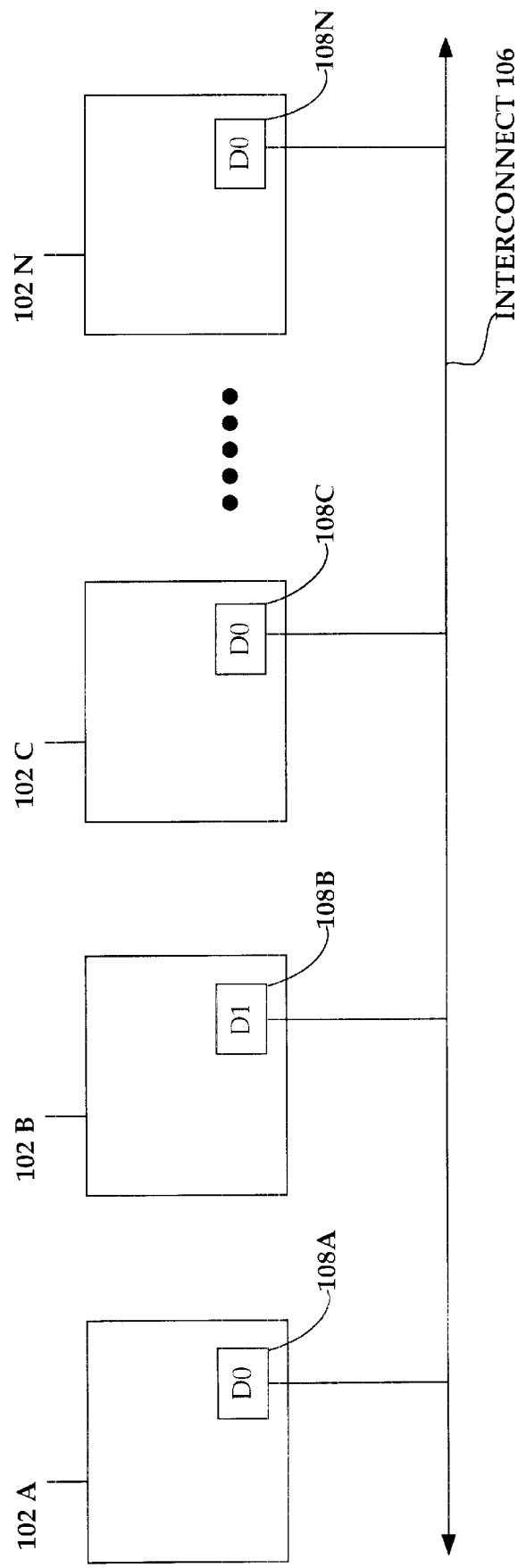
FIG. 2B shows one cache line being valid while others are invalidated.
Figure 3:
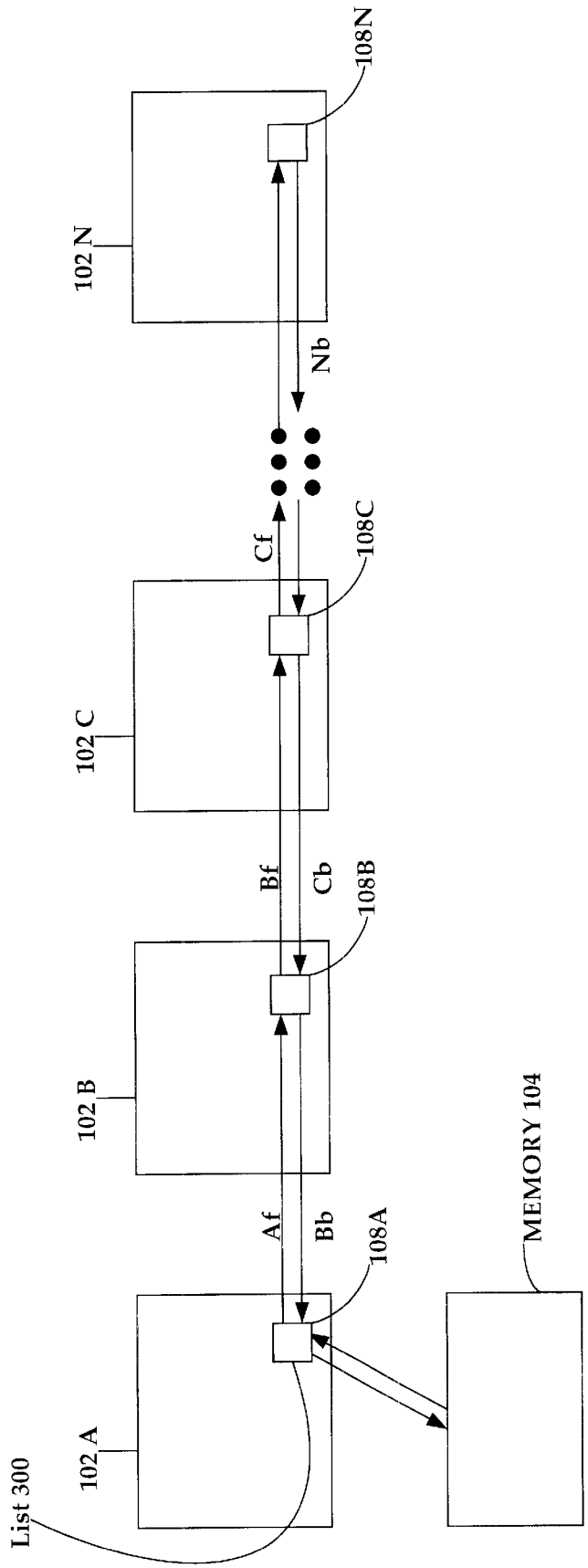
FIG. 3 shows a cache-sharing double-linked list.
Figure 4A:
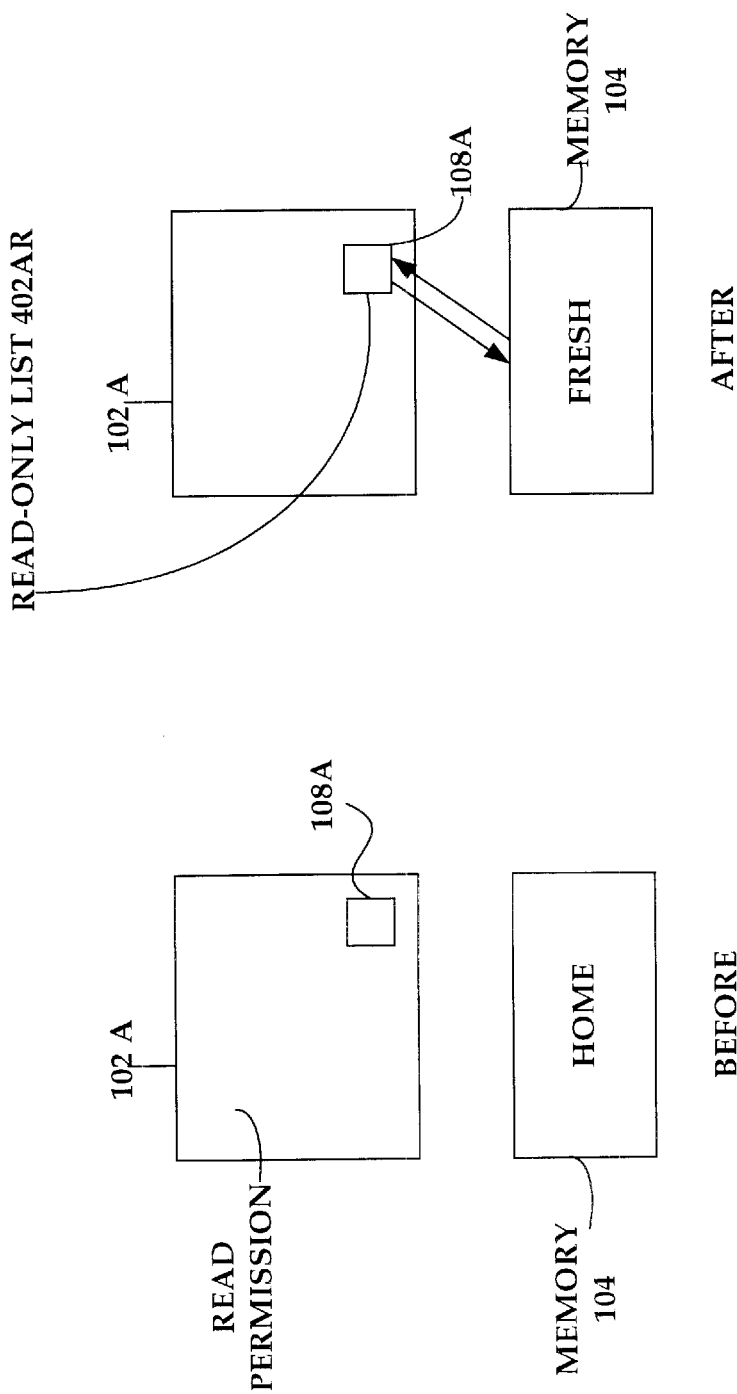
FIG. 4A illustrates a creation of a read-only shared list.
Figure 4B:
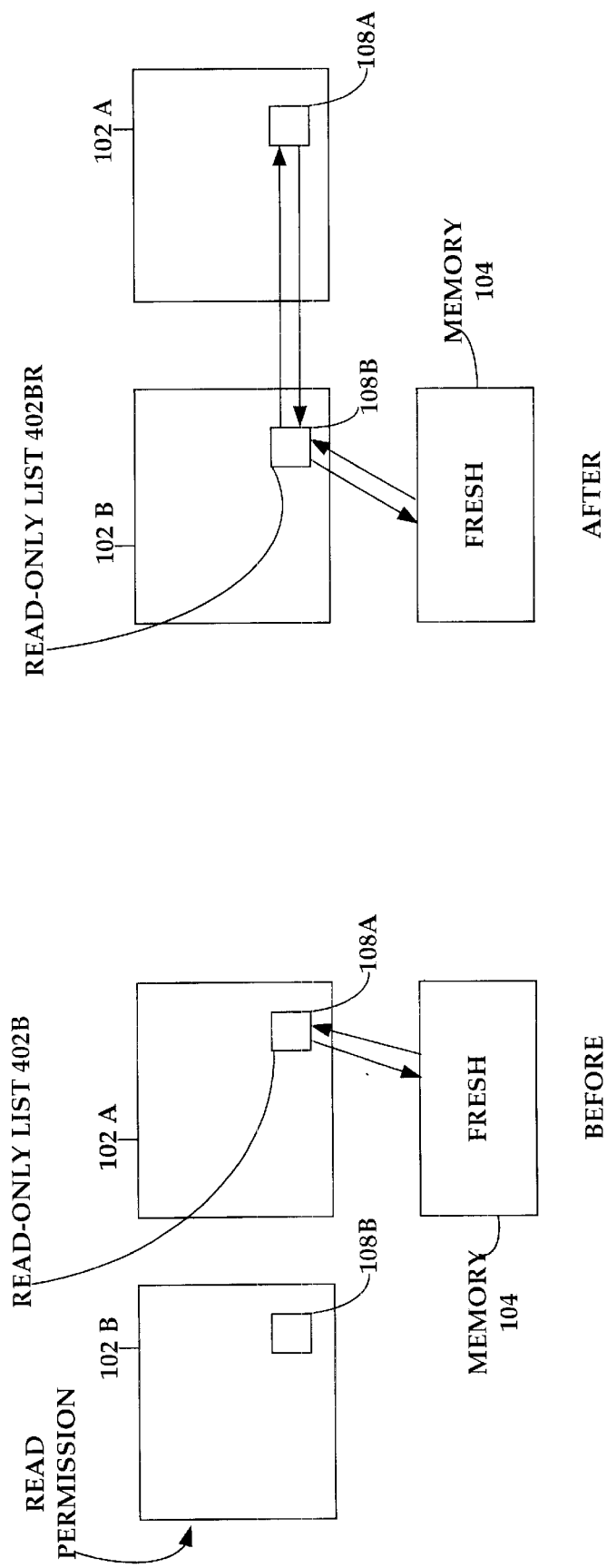
FIG. 4B illustrates a cache entry entering a shared read-only list.
Figure 4C:
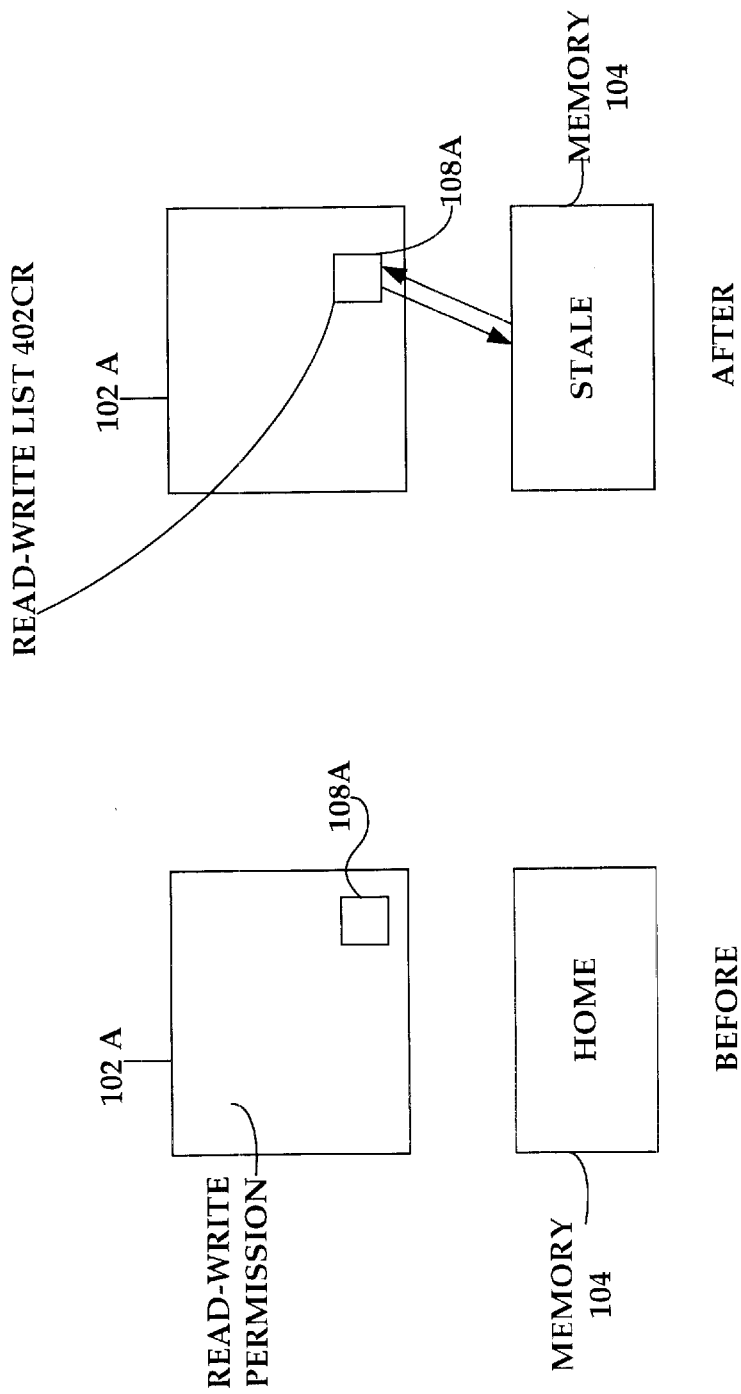
FIG. 4C illustrates creation of a read-write shared list.
Figure 4D:
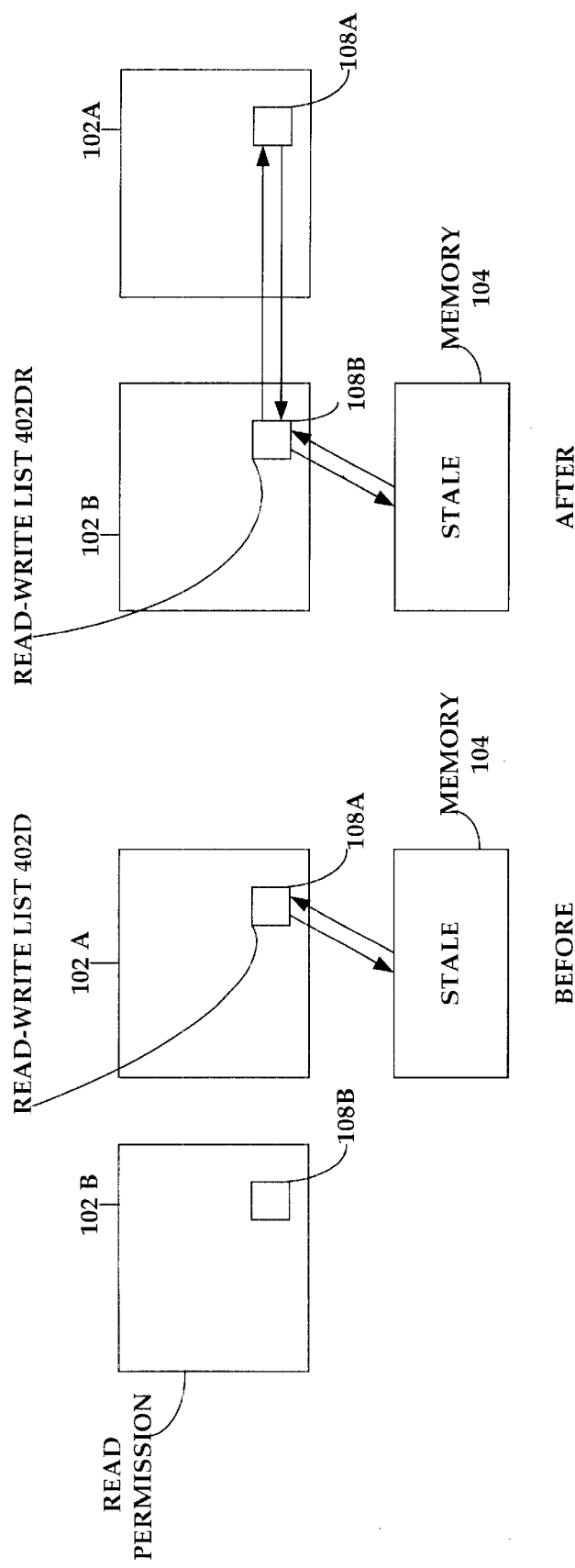
FIG. 4D shows a read-permission entry entering a read-write list.
Figure 4E:
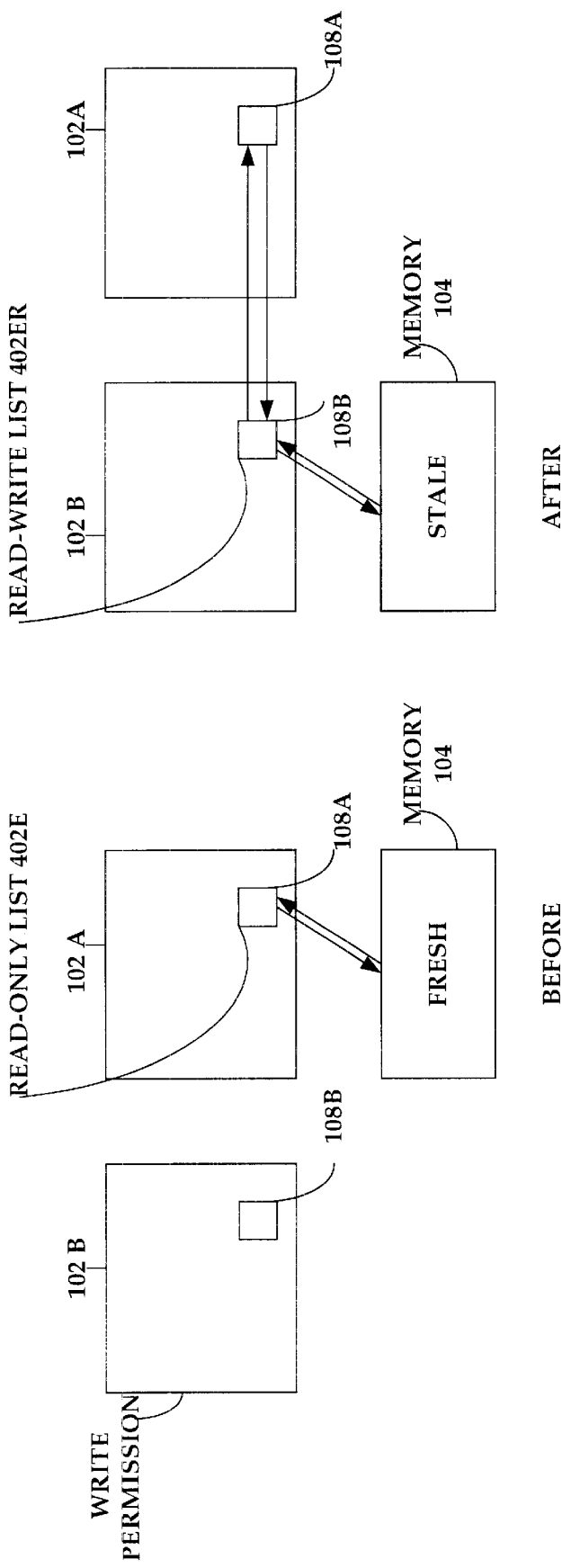
FIG. 4E shows a write-permission entry entering a read-only list.
Figure 4F:
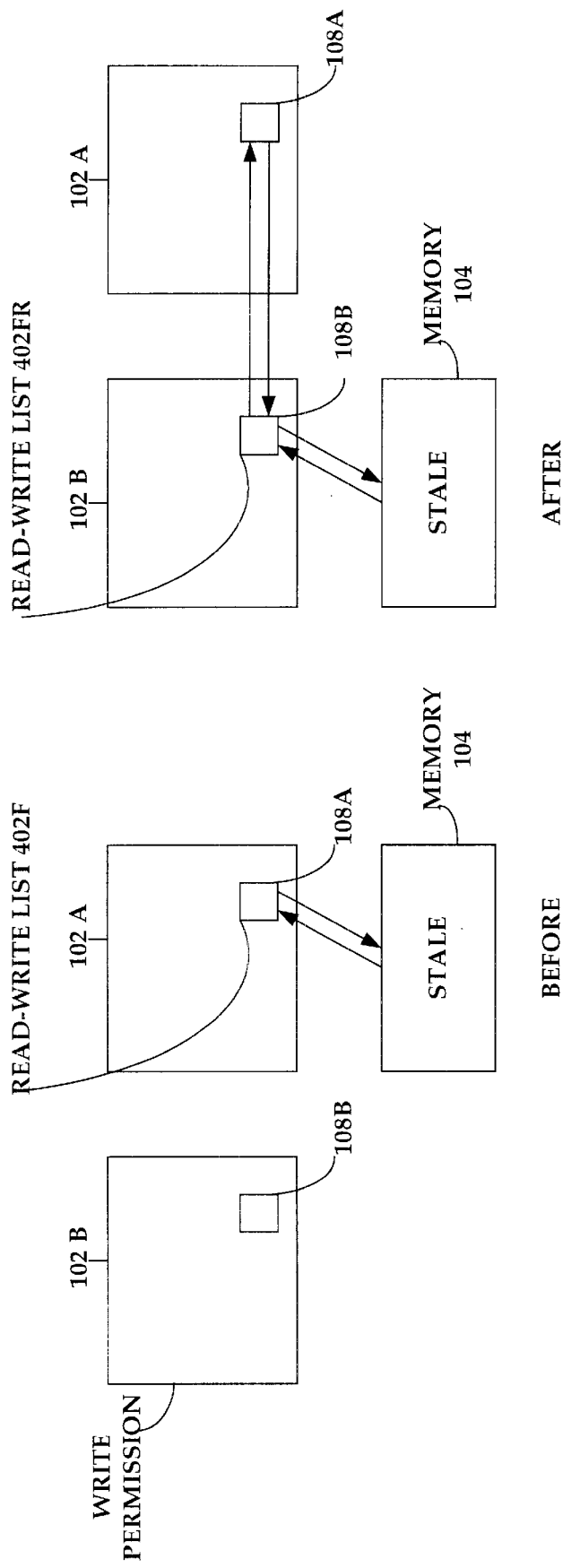
FIG. 4F shows a write-permission entry entering a read-write list.

In row 1a, memory 104, receiving an "mReadFresh" request, changes state to "FRESH," points to the requested cache ("IDreq"), and returns a "DONE_H" response. An "H" indicates that memory 104 was previously in the "HOME" state. In the example of FIG. 4A, "IDreq" is associated with cache 108A because processor 102A having a cache 108A that requests a read-only permission.

In row 1b, memory 104, receiving an "mReadOwned" request, changes state to "STALE," also points to the requested cache (e.g., cache 108A of FIG. 4C), and returns a "DONE H" response.

In rows 2a and 2b memory 104 was initially in a "FRESH" state. Memory 104 again may receive either an "mReadFresh" or an "mReadOwned" request in row 2a and row 2b, respectively. In both cases, memory 104 points to the requested cache ("IDreq") and returns a "DONE F" response. An "F" indicates memory 104 was previously in the fresh state. However, in row 2a memory 104 remains the "FRESH" state while in row 2b memory 104 changes state to "STALE."

In rows 3a and 3b memory 104 was in the "STALE" state. In both cases of receiving an "mReadFresh" or an "mReadOwned" request in row 3a and row 3b, respectively, memory 104 changes state to "STALE," points to the requested cache ("IDreq" for new ID), and returns a "DONE_S" response. An "S" indicates that memory 104 was previously in the stale state.

FIG. 10 shows a state-transition table of a cache responder 704 of a cache 108. Responder 704 receives a request to invalidate itself, which is either a "cMarkInval_F" or a "cMarkInval_S" in rows having a suffix "a" or "b," respectively. Responder 704's behaviors are the same for both cases except, as otherwise indicated below, memory 104 in rows "a" was in the read-only state (indicated by an "F" in "cMarkInval_F") and memory 104 in rows "b" was in the read-write state (indicated by an "S" in "cMarkInval_S"). A "c" indicates that the request is from a cache entry 108, rather than memory 104. A "MarkInval" is for responder 704 to invalidate itself.

In rows 1a and 1b, responder 704, is not the head of the list, has a "CORE" old state, and generates a "MORE" response with an identity "IDnext" of a next cache entry to indicate that at least one additional cache entry is to be invalidated. Responder 704, after being invalidated, changes state to "INVAL."

In rows 2a and 2b responder 704 is a tail entry of the list, has a "TAIL" old state, and generates a "LAST" response to indicate that responder 704 is the last entry in the list, then, after being invalidated, changes state to "INVAL."

In rows 3a and 3b responder 704 has a "HEADd_INVAL" old state, that is, responder 704 is the head ("HEAD") of a read-write group (the situation in FIG. 5C where cache entries 108A_1, 108B, 108C, and 108D have been invalidated). While cache entry 108A_2 is invalidating, e.g., cache entries 108O, 108P, and 108Q, cache entry, e.g., 108Z is entering the list and trying to invalidate cache entry 108A_2. Cache entry 108A_2 thus generates a "BUSY" response to indicate that it cannot be invalidated, and then remains the "HEADd_INVAL" state.

In row 4a the list has both cache entries 108A_1 and 108A_2 ("PAIR"), and a cache entry, e.g., 108Q is trying to invalidate cache entry 108A_1. In accordance with the invention, this invalidation to cache entry 108A_1, which has a read-only state (discussed above), is recognized by preferably an "F" in the "cMarkInval_F" request. An "f" in the "PAIRfd_INVAL" old state indicates that memory 104 was previously in the read-only state. Cache entry 108A_1 then generates a "MORE" response with an identity "IDnext" to indicate that at least one additional next cache entry is to be invalidated. After cache entry 108A_1 has been invalidated, cache 108 now has only one copy (e.g., 108A_2) in the list, cache 108A_2 changes state to "HEADd_INVAL."

In row 4b, a cache entry, e.g, 108Z is trying to invalidate cache entry 108A_2. This invalidation to the cache entry 108A_2, which has a read-write state (discussed), is recognized by preferably an "S" in the "cMarkInval S" request.

Because cache 108A_2 is busy invalidating other cache entries, e.g, 108O, 108P, etc., cache 108A_2 generates a "BUSY" response, and remains the state "HEADd_INVAL."

Rows 5a and 5b are the same as rows 4a and 4b, except that rows 5a and 5b deal with the situations in which memory 104 was previously in the read-write state (indicated by an "s" in the "PAIRsd_INVAL" old state).

In row 6a responder 704 has the "LEADf_INVAL" old state indicating that the list has both cache entries 108A_1 and 108A_2, but all cache entries, e.g, 108B, 108C, and 108D, to the right of cache entry 108A_1 have been invalidated. An "f" in "LEADf_INVAL" indicates that memory 104 was in the read-only state, and an "F" in "cMarkInval_F" indicates that a cache entry, e.g., 108Q is trying to invalidate cache entry 108A_1, which is the head of a read-write list. Cache entry 108A_1 thus generates a "LAST" response to indicate that it is the last in the list, and changes state to "HEADd_INVAL."

In row 6b an "S" in "cMarkInval_S" indicates that a cache entry, e.g., 108Z is trying to invalidate cache 108A_2, which has a read-write state. Cache entry 108A_2, when being busy invalidating other cache entries, e.g., 108O, 108P, etc., generates a "BUSY" response, and remains the "LEADf INVAL" state.

Rows 7a and 7b are the same as row 6a and 6b respectively, except that rows 7a and 7b deal with the situations in which memory 104 was previously in the read-write state (indicated by an "s" in "LEADs_INVAL").

The present invention has been explained above with reference to a preferred embodiment. Other embodiments will be apparent to those skilled in the art after reading this disclosure. For example, the invention may be implemented in either software or hardware and any method implementation of lists can utilize the invention. Additionally, the invention may effectively be used in combination with multi-processor systems other than that described above in accordance with the preferred embodiment. Therefore, these and other variations upon the preferred embodiment are intended to be covered by the following claims.

What is claimed is:

1. In a multi-processor computer system, a method for updating a cache sharing list having at lease one entry including a head entry, comprising the steps of:
   allowing a first copy and a second copy of said head to exist in two locations in said list, said first copy and said second copy having a respective distinct state;
   using distinct command codes to prepend a first group of cache entries to said first copy and a second group of cache entries to said second copy; and
   updating said list.

2. A method as in claim 1 wherein the step of updating comprises the steps of:
   servicing said first group;
   modifying said second copy; and
   invalidating stale entries.

3. A method as in claim 2 wherein the step of updating comprises the further step of servicing said second group.

4. A method as in claim 3 wherein the step of servicing said first group and servicing said second group uses said command codes.

5. A method as in claim 4 comprising the further step of said head requesting an update of said list from read-only to read-write.

6. In a multi-processor computer system having a cache sharing list of at least one entry including a head entry, a method for updating said head when at least one additional entry concurrently enters the list after a request for updating is generated, comprising the steps of:

allowing a first copy and a second copy of said head entry to exist in two locations in said list, each of said copies having a respective distinct state;

prepending to said first copy;

prepending to said second copy; and updating said list.

7. A method as in claim 6 wherein the step of prepending to said first copy and to said second copy is based a set of command codes.

8. A method as in claim 6 wherein said step of updating includes:

modifying said second copy; and invalidating stale copies.

9. In a multi-processor computer system, an apparatus for updating a cache sharing list having at lease one entry including a head entry, comprising:

means for allowing a first copy and a second copy of said head to exist in two locations in said list, said first copy and said second copy having a respective distinct state;

means for using distinct command codes to prepend a first group of cache entries to said first copy and a second group of cache entries to said second copy; and means for updating said list.

10. An apparatus as in claim 9 wherein the means for updating comprises:

means for servicing said first group;

means for modifying said second copy; and means for invalidating stale entries.

11. An apparatus as in claim 10 wherein the means for updating further comprises means for servicing said second group.

12. An apparatus as in claim 11 wherein means for servicing said first group and servicing said second group uses said command codes.

13. An apparatus as in claim 12 further comprising means for said head to request an update of said list from read-only to read-write.

\* \* \* \* \*